Patented July 5, 1932

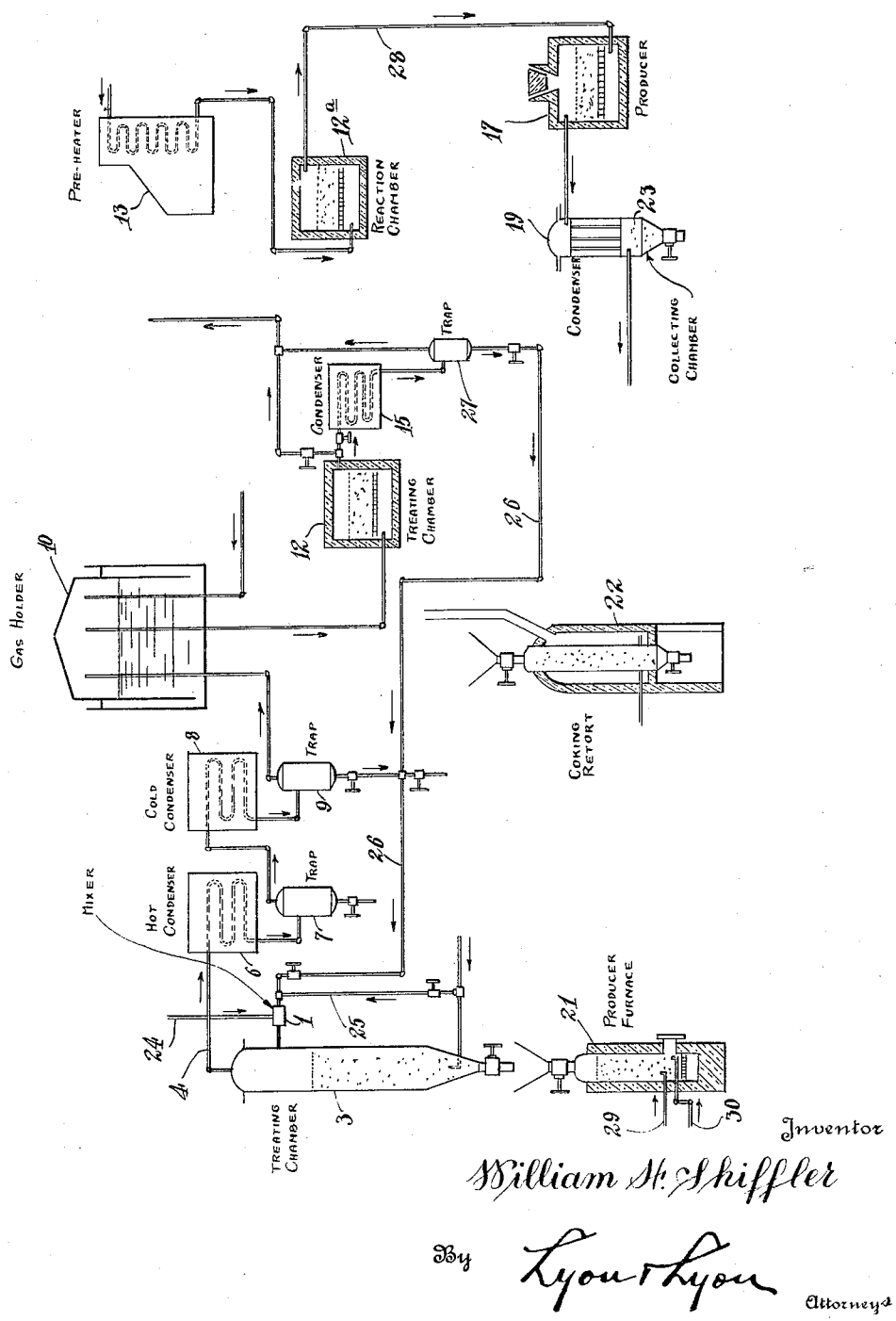

1,865,797

UNITED STATES PATENT OFFICE

WILLIAM H. SHIFFLER, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

PROCESS FOR TREATING METALLIC HALIDE RESIDUE

Application filed September 8, 1926. Serial No. 134,327.

This invention relates to a method of treating a metallic halide residue produced from the treatment of hydrocarbons with metallic halides, and the object of the invention is to first effect a separation of the halogen portion of the residue in the form of a halogen acid by a rapid and inexpensive process and then prepare therefrom an anhydrous metallic halide.

Metallic halides, such as aluminum chloride, are at present employed in the treatment of hydrocarbons, such as petroleum. In the process of treatment a tarry or pitchy residuum is produced which separates from the hydrocarbons being converted and carries the metallic halide with it in a mechanical or chemical combination. This tar phase increases as the operation continues and reduces the activity of the metallic halide until finally the rate of reaction is negligible even with continual agitation of the oil and tar phases. At this point the residue must be withdrawn.

The extensive commercial use of metallic halides, such as aluminum chloride, is restricted largely because of the cost of recovering the catalyst from the residue. In existing processes of recovery the methods are somewhat varied, some processes attempting to recover the catalyst directly as anhydrous aluminum chloride and others to recover hydrated aluminum chloride which is then converted to the anhydrous form. A very imperfect recovery of the aluminum chloride is obtained when the aluminum chloride is attempted to be recovered in the anhydrous state. When the aluminum chloride is recovered in the hydrated form it requires costly processing to convert it to the anhydrous state.

By far the most valuable part of the aluminum chloride residue is its chlorine content. The present invention is directed to a process for the recovery of this chlorine from the residue through conversion of the residue into hydrochloric acid and the conversion of such hydrochloric acid into the anhydrous aluminum chloride. In general the process consists in contacting aluminum chloride residues (or other metallic halide residues such as ferric chloride residue and the like) with water or steam at elevated temperatures sufficient to form a gas containing hydrogen chloride together with some hydrocarbons and a carbonaceous residue containing alumina. Chlorine is then prepared from the hydrochloric acid so produced and is contacted with alumina and carbon at high temperatures to produce aluminum chloride. The alumina for the process may be derived from any source, such as bauxite, clay or alunite, but I prefer to utilize the alumina that is recovered from the carbonaceous residue by burning the residue either completely or partially as in the production of either producer gas or water gas.

The invention together with various objects and advantages thereof will be understood from the description of a preferred example of the process embodying the invention. For this purpose reference is made to the accompanying drawing wherein there is illustrated a form of apparatus in which the process may be conducted.

Referring to the drawing, the preferred process is performed by introducing aluminum chloride residue into mixer 1 from line 24. It is understood that the method of recovery is applicable to the metallic halide residues from any operation, which involves the treatment of a hydrocarbon material with a metallic halide, whether the hydrocarbon be derived from petroleum, shale, coal, or any other source. In the following description of process, the process will be described with reference to an aluminum chloride residue derived from the treatment of petroleum hydrocarbons as typical of the group.

In mixer 1 the aluminum chloride residue is thoroughly admixed with steam from line 25 and the mixture discharged into the treating vessel 3. Steam may be supplied as such or may be supplied in the form of water or hydrochloric acid solution obtained in the other steps of the process. The heat may be supplied by the residual heat of the hot residue or by other means. The carbonaceous residue containing alumina settles out in the lower part of the chamber and hydrogen chloride gas produced, together with volatilized hydrocarbons, hydrocarbon gases and any excess steam present are discharged through line 4 to hot condenser 6.

There are several mechanical methods of contacting steam, water or hydrochloric acid solutions with hot residue to effect the desired reaction. In the apparatus illustrated in the drawing the residue in liquid or finely divided solid form is mixed with steam at or about 212° F. An alternative method of decomposing the residue is by blowing steam through a bath of liquid residue or through a bed of solid residue until the desired quantity of hydrogen chloride is produced. If the carbonaceous residue produced is desired to be employe as a fuel it may be further heated during the steaming operation in order to convert it into a useful solid fuel. As a further modified method of decomposing the aluminum chloride residue, the residue, either liquid or as finely divided solid, may be atomized through a nozzle and steam admixed therewith after the atomizing process. This treatment may be carried out counter-flow or counter-current. A further method of decomposing the residue is to partially coke the same and contact the residue with steam. It is understood that in each of the methods of decomposing the residue the residue may be decomposed into a solid or liquid carbonaceous residue, depending upon the character of the original aluminum chloride residue. Preferably the aluminum chloride residue should be contacted with the steam at an elevated temperature between 300° and 600° F.

The hot gases passing into the condenser 6 are there partially cooled so that some of the hydrocarbon material separates. This material is passed into the trap 7 and remaining vapors passed to a cold condenser 8 where any excess water used in the steaming operation is condensed in the form of a hydrochloric acid solution together with some low boiling hydrocarbons. This hydrochloric acid is withdrawn at trap 9, separated from any hydrocarbons that condense with it, and returned to mixer 1 for further contacting with fresh residue. 26 indicates a line for conveying this hydrochloric acid solution back to the mixer 1.

After condensation in condenser 8 the remaining gas consists of hydrogen chloride together with a small amount of hydrocarbon gas and may or may not contain a small amount of water vapor. Said gas is led to a gas holder 10.

The hydrogen chloride gas may be processed to form chlorine in any desired manner so as to provide a source of chlorine for the manufacture of anhydrous aluminum chloride. For example, the hydrogen chloride gas may be combined with oxygen, in the presence of a catalyst, in accordance with the well known Deacon process. Since this reaction is not complete the resulting product contains oxygen and hydrogen chloride gas as well as water vapor and chlorine. This admixture may be then cooled to separate it into chlorine and oxygen and a hydrochloric acid solution. Said hydrochloric acid solution may then be utilized in the steaming of the aluminum chloride residue, serving as a source of water for such reaction, with the result that the complete process results in a complete conversion of the hydrogen chloride gas into chlorine, and the water formed in the Deacon reaction does not accumulate in the process since it is removed in the decomposing of the aluminum chloride residue. The preferred method of processing the hydrogen chloride gas to form chlorine is, however, that described in my co-pending application Serial No. 134,328, date filed Sept. 8th, 1926. In accordance with such process the hydrogen chloride gas is contacted in chamber 12 with magnesium oxide at a temperature sufficient to form magnesium chloride, and preferably to form dry magnesium chloride. The temperature may be from 200° C. to 700° C. and the reaction is rapid and complete at temperatures up to 500° C. Since the reaction is exothermic the temperature will continue to rise and may exceed the temperature at which complete conversion is obtained. If the temperature is permitted to rise above this point the exit gases are passed into condenser 15 wherein hydrochloric acid solution is condensed therefrom and passed into trap 27 from which it may be withdrawn through line 26 and utilized in treater 3.

In the treating chamber 12 the magnesium oxide is preferably only partially converted to the magnesium chloride, preferably leaving at least 20 percent of the magnesium in the form of the oxide. The mixed magnesium oxide and chloride is now contacted with air or oxygen at a temperature preferably between 600° and 1000° C. to produce chlorine, the particular temperature depending upon the rate of reaction desired. This operation is shown in a separate reaction chamber 12a, since preferably, in practice, the process is operated continuously and several units or chambers such as 12 and 12a are employed, in which magnesium chloride is alternately prepared and decomposed into chlorine. The air for the operation is preferably passed through a preheater 13 so that by heating of the air the desired heat for the reaction is provided. The rate of passage of air through the mixed magensium chloride and magnesium oxide is such that the chlorine produced usually contains some oxygen. At the higher temperatures the reaction is much more rapid than at the lower temperatures and the magnesium chloride is made to contain a small percentage of magnesium oxide in order that the admixture will not melt during the process. Whereas magnesium chloride melts at 708° C. the mixed magnesium chloride and oxygen may be heated to 1000° C. without melting, with the result that the decomposing reaction takes place at a greatly accelerated rate.

The chlorine produced is then passed through line 28 into an aluminum chloride producer 17 where it is contacted with an intimate mixture of alumina and carbon maintained at 700° C. to 1000° C. The temperature is maintained by any one of the following processes: Excess carbon may be charged with alumina over that required for the reaction and the oxygen content of the chlorine gas maintained high enough to supply the heat by reaction with the carbon, or preheated air may be admixed with the chlorine gas. The alumina-carbon mixture may be preheated before being placed in the producer 17. Anhydrous aluminum chloride and carbon monoxide are produced and the hot gases are conducted to condenser 19 where the aluminum chloride is condensed in solid form and scraped from the collecting walls to the collecting chamber 23, from which it is conveyed to storage. The residual carbon monoxide passing from chamber 19 is suitable for fuel. The source of alumina employed in the producer 17 may be the carbonaceous residue obtained in treater 3. For example, the residue from treater 3 is indicated as being charged to a producer gas furnace 21 and there contacted with air and steam from lines 29 and 30 respectively to form an alumina ash which is recovered at the bottom of the furnace. Said alumina ash is then preferably admixed with asphalt and the admixture coked in a coking retort 22 until substantially all of the hydrogen content of the asphalt is removed.

While the particular process of treating aluminum chloride residues or other metallic halide residues herein described is well adapted for carrying out the objects of the invention various modifications and changes may be made without departing from the spirit of the invention, and the invention includes all such changes, modifications and substitution of equivalents as come within the scope of the following appended claims.

I claim:

1. A process of treating aluminum chloride residues derived from the treatment of hydrocarbons, which process comprises atomizing the residue in the presence of steam at a temperature above 100° C. to decompose the residue into hydrogen chloride and a carbonaceous residue containing alumina, separating the gas from said carbonaceous residue.

2. A process of treating aluminum chloride residues derived from the treatment of hydrocarbons which comprises atomizing the residue in the presence of steam at a temerature above 100° C. to produce a gas containing hydrogen chloride and water, cooling the gas to condense water together with some hydrogen chloride, and returning the condensed solution to provide the steam for the decomposing of further residue.

3. In a process of recovering the chlorine constituent from aluminum chloride residues derived in the treatment of hydrocarbons, the step of increasing the hydrogen chloride content of a hydrogen chloride water admixture, or solution, by contacting the same with the residue.

4. In a process of recovering the chlorine constituents from carbonaceous residues derived from the treatment of hydrocarbons with metallic chloride, the step of contacting such carbonaceous residues with a hydrochloric acid solution at a temperature above 100° C., to decompose said residue and evolve a gas containing water and hydrogen chloride therefrom, cooling the gas to condense water together with some hydrogen chloride, separately collecting uncondensed hydrogen chloride from said gas, and reusing said condensate in the treatment of further carbonaceous residues.

5. A process of treating aluminum chloride residues derived from the treatment of hydrocarbons comprising atomizing the residue in the presence of steam at a temperature of above 100° C. to decompose the residue into hydrogen chloride and a carbonaceous residue containing aluminum, separating the gas from said carbonaceous residues, cooling the gas to condense hydrochloric acid solutions therefrom and separately collecting uncondensed hydrogen chloride from said gas.

6. A process of treating aluminum chloride residues derived from the treatment of hydrocarbon with aluminum chloride comprising atomizing the residues in the presence of steam at a temperature of above 100° C. to produce a gas containing hydrogen chloride and water, cooling the gas to condense water together with some hydrogen chloride, separately collecting uncondensed hydrogen chloride from said gas and employing the condensed solution to provide the steam for the decomposing of further residues and the production of additional hydrogen chloride.

Signed at San Francisco this 27th day of August, 1926.

WILLIAM H. SHIFFLER.